United States Patent
Goecke

(10) Patent No.: US 8,088,480 B2
(45) Date of Patent: Jan. 3, 2012

(54) ADHESIVE TAPE

(75) Inventor: Thomas R. Goecke, Rocky River, OH (US)

(73) Assignee: Shieldmark, Inc., Rocky River, OH (US)

( * ) Notice: Subject to any disclaimer, the term of this patent is extended or adjusted under 35 U.S.C. 154(b) by 1013 days.

(21) Appl. No.: 10/674,108

(22) Filed: Sep. 29, 2003

(65) Prior Publication Data

US 2005/0069697 A1    Mar. 31, 2005

(51) Int. Cl.
*D06N 7/04* (2006.01)
*C09J 7/02* (2006.01)
*B32B 7/12* (2006.01)

(52) U.S. Cl. ........ 428/343; 428/141; 428/332; 428/337; 428/906

(58) Field of Classification Search .................. 428/40.1, 428/40.6, 41.3, 41.6, 42.1, 207, 343, 354, 428/217, 908.8, 40.8, 141, 174, 332, 337, 428/906
See application file for complete search history.

(56) References Cited

U.S. PATENT DOCUMENTS

| | | | | |
|---|---|---|---|---|
| 2,559,990 A * | 7/1951 | Oace et al. | ..................... | 428/337 |
| 3,895,153 A * | 7/1975 | Johnston et al. | ............... | 428/141 |
| 4,248,762 A * | 2/1981 | Hornibrook et al. | ......... | 524/441 |
| 4,343,856 A * | 8/1982 | Goswami et al. | ............. | 428/332 |
| 4,484,574 A * | 11/1984 | DeRusha et al. | ................ | 602/75 |
| 5,061,559 A * | 10/1991 | Ogusi et al. | | |
| 5,246,773 A * | 9/1993 | Mamish | | |
| 5,496,636 A * | 3/1996 | Gu et al. | | |
| 5,508,084 A * | 4/1996 | Reeves et al. | ................. | 428/172 |
| 5,686,170 A * | 11/1997 | Condon et al. | ................ | 428/207 |
| 5,839,977 A * | 11/1998 | Maurer et al. | ................ | 473/446 |
| 6,036,997 A * | 3/2000 | Ragland et al. | | |
| 6,245,382 B1 * | 6/2001 | Shvartsman et al. | | |
| 6,277,468 B1 * | 8/2001 | Nakamoto et al. | | |
| 6,440,538 B1 * | 8/2002 | Ungar | ........................ | 428/195.1 |
| 6,461,715 B1 * | 10/2002 | Guenther et al. | ............. | 428/131 |
| 6,509,084 B2 * | 1/2003 | Sturtevant et al. | | |
| 6,668,504 B2 * | 12/2003 | Hughart | ....................... | 52/481.1 |

OTHER PUBLICATIONS

Merriam-Webster's Collegiate Dictionary, 1996, Merriam-Webster, Incorporated, Tenth Edition, pp. 335 and 1205.*
High Quality Tapes and Labels, Windmill Tapes—Industrial PVC Tapes, http://www.windmilltapes.com Product Data Sheet.*
Handbook of Pressure Sensitive Adhesive Technology, 3d Edition, Satas & Associates, 1999, Chapter 5—Peel Adhesion, p. 79.

* cited by examiner

*Primary Examiner* — Patricia Nordmeyer
(74) *Attorney, Agent, or Firm* — Brennan, Manna & Diamond

(57) ABSTRACT

The adhesive tape of this application comprises a layer of polymeric material, particularly a polyvinyl chloride, having a Shore A Hardness of between 92 and 100 and a layer of adhesive material attached to a surface of the layer of polymeric material.

13 Claims, 1 Drawing Sheet

ADHESIVE TAPE

BACKGROUND

This invention relates to an adhesive tape having superior ductility, strength, tear resistance and abrasion resistance, particularly a pressure sensitive adhesive. Polymeric pressure sensitive adhesive tapes are economical and adaptable to many different applications. One primary example is as floor marking in industrial and factory environments. However, there are several disadvantages to using such tape in industrial settings. One disadvantage is that the tape lacks sufficient strength and hardness to prevent wearing, tearing, cracking and breakage from heavy and repeated traffic, such as from forklift trucks. Similarly, as a result of poor adhesive quality, repeated traffic has a tendency to detach many commercially available tapes from the floor. Another disadvantage is that the aesthetic qualities and physical properties of the tape are diminished from scuffing, scratching, and the like. Such disadvantages plague existing polymeric pressure sensitive adhesive tapes. Because of these disadvantages that have been associated with polymeric pressure sensitive adhesive tape, wide industry acceptance has been historically difficult to achieve. Accordingly, many opt to rely on the time consuming and exacting practice of painting.

In view of the above discussion, it is an advantage of the present invention to provide a polymeric adhesive tape that has superior ductility, strength, tear resistance and abrasion resistance. Other advantages of the present invention will be apparent from the following detailed description.

SUMMARY OF INVENTION

According to one embodiment, an adhesive tape is provided. The tape has a first layer of polymeric material having a Shore A Hardness of between 92 and 100 and a thickness of between 0.020" and 0.065", and a second layer of adhesive. Preferably, the adhesive is of a pressure sensitive type.

DETAILED DESCRIPTION OF THE INVENTION

Figure 1:
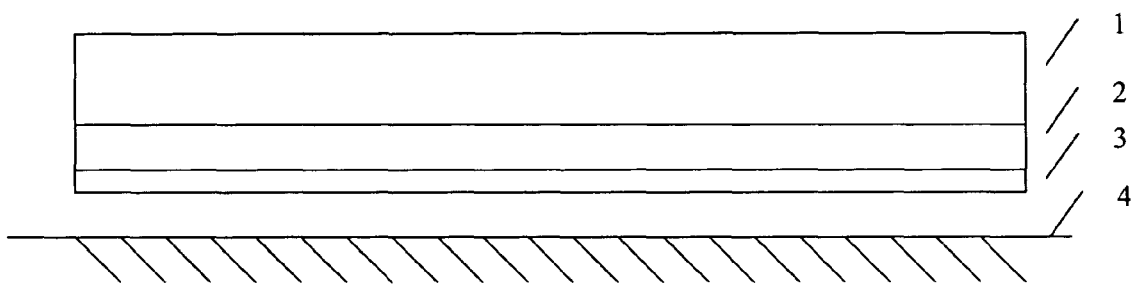
FIG. 1 is a cross-sectional view illustrating the embodiment of a polymeric pressure sensitive adhesive tape.

The adhesive tape of this invention usually comprises a layer of polymeric material and at least one layer of adhesive material. The pressure-sensitive adhesive tape of this invention is not limited to having only the above layers of polymeric material and layer of pressure-sensitive adhesive material. It may optionally have an additional layer, such as a laminating substrate on an outermost side of the above adhesive layer. The laminating substrate is usually peeled off and thrown away when pressure-sensitive adhesive tape is actually used. Therefore, inexpensive materials are preferred, however, there are no particular limitations on the materials used for the laminating substrate.

FIG. 1 is an example of the pressure-sensitive adhesive tape of this invention wherein a layer of polymeric material (1) is attached to the top side of a layer of pressure-sensitive adhesive material (2) and a laminating substrate (3) is attached to the bottom side of the pressure-sensitive adhesive material. Upon removal of the laminating substrate (3), the tape can be applied to a floor (4) with the application of pressure.

The pressure-sensitive adhesive tape of this invention can be produced in a variety of lengths, widths, and thickness. A variety of colors can also be used for the outer surface of the layer of polymeric material (1). For example, safety yellow can be used for aisle markings, or red can be used for quarantine and reject markings in a production facility. Coloring can be achieved by introducing a colorant in any form, including pigments and dyes into the polymeric material.

The adhesive employed in layer material (3) may be any of those heretofore employed in the art for preparing adhesive structures. By way of illustration, suitable adhesives of this general description include those disclosed in U.S. Pat. No. 5,061,559, herein incorporated by reference.

The layer of polymeric material (1) may be a durable polymer such as polyvinyl chloride, polycarbonate, or a terpolymer comprised of acrylonitrile, butadiene and styrene or the like. A clear or tinted polyvinyl chloride is a preferred material. The polymer selected must have Shore A Hardness between, for example, 92-100, and preferably between 93-97. The outer surface of the layer of polymeric material (1) is preferably textured. The layer of polymeric material (1) may have a thickness of about, for example, 0.020" to 0.065".

Advantageously, this embodiment of the invention provides improved tear resistance, strength, and abrasion resistance by employing the sum or all of the combination of polymer selected, Shore A Hardness, textured surface, and layer thickness.

EXAMPLES

One embodiment of the invention will be described below in greater detail through the following examples.

Test samples were performed on a 4" wide sample of the pressure sensitive adhesive tape of this invention. The example tape was constructed of a semi-rigid 95A polyvinyl chloride from Artemis Industries, 2550 Gilcrest Rd, Akron Ohio 44305 which was extruded from a 2½" diameter NRM extrusion machine at 360-380° F. at an extrusion rate of 400 ft per hour to yield a 0.065 thick, 4" wide layer. A textured first surface of the extruded polymer layer was achieved by following the above process parameters. During extrusion a rubberized double sided carpet tape (Product #591B) from International Tape Co., P.O. Box 240, 6 Industrial Drive, Windham, N.H. 03087 was applied to a second side of the extruded polymer layer. A tape from Windmill Tapes of Great Britain (www.windmilltapes.com) was used for comparison purposes. Test samples were conditioned at 73±3° F. and 50±5% relative humidity for at least 24 hours prior to testing.

Tensile strength at yield point was determined according to ASTM D 882 testing method. A 0.5"×8" sample was prepared and placed in the jaws of the instrument at a separation of 4.0". The tester was started at a separation rate of 2.0 in/min. At the instance the tape yielded the force was recorded. Five replicates of each sample were conducted and the results were normalized to pounds per inch width. Results indicate higher yield point and higher absolute forces involved at yield point for the pressure sensitive adhesive tape of this invention. Particularly, the yield point in both machine and traverse direction were respectively, on average, 3,176 lb/in$^2$ and 3,136 lb/in$^2$.

Tear resistance was determined according to the ASTM D 1004 test method. The samples were die cut according to the method. The liner from the sample was removed and the sample was placed in the jaws of the tester at a separation of one inch. The tester was started at a rate of 2.0 in/min. The maximum force encountered during testing was recorded. Five replicates of each sample in both the machine and traverse direction were tested. Results indicate substantially improved tear strength in both the machine and traverse directions for the pressure sensitive adhesive tape of this invention. Particularly, the tear strength in both machine and traverse direction was respectively, on average, 22.3 lb and 22.1 lb.

Caliper or thickness was determined according to the PSTC-33 method. Caliper of the material was determined both with and without the liner. Ten replicates of each sample were measured. Results indicate substantially increased thickness of the pressure sensitive adhesive tape of this invention, partly because of the inherent characteristics of the semi-rigid surface. Particularly, the thickness of the material, with and without the liner, was respectively, on average, 68.4 mil and 65.4 mil.

Peel adhesion was tested according to a modified PSTC-101D method. The modification included dwell time. Peel adhesion is a measure of the strength of the adhesive bond between the tape and the test surface. Exactly one (1.0) inch wide samples were applied to a standard stainless steel test panel at a rate of 24 in/min with a 4.5 pound rubber covered roller according to the method. The tape was then peeled from the substrate at a 90° angle after a dwell time of one hour. The force required for removal was measured. Five replicates of each sample were tested. Results indicate substantially increased peel adhesion for the pressure sensitive adhesive tape of this invention when applied to stainless steel. Particularly, the peel adhesion of this material was, on average, 5.2 lb/in width.

Abrasion resistance was determined according to a modified ASTM D 5264 test method. The material was cut to a 2.5"×6" size. A new 2"×4" piece of standard A-5 receptor material (moderate abrasive) from Gavarti Associates Ltd. was affixed with double-sided tape to the four pound instrument weight (0.5 lb/in2 load). This in turn was placed over the test sample. The instrument was set for 100 strokes and operation was initiated. The instrument strikes an arc with the abrasive over the test material. Each stroke consists of one motion back and forth over the sample. When the cycles were completed the weighted abrasive was lifted and the test sample removed. At the conclusion of the test the overall quality of each sample was evaluated relatively for scratch resistance. Results indicate that the abrasion resistance of the pressure sensitive adhesive tape of this invention is improved over the comparative tape.

Results obtained were as follows:

|  | Average | σ (standard deviation) | N (test numbers) |
|---|---|---|---|
| Tensile at Yield at 2.0 in/min, lb/in$^2$ | | | |
| Inventive Sample Machine Direction | 3,176 | 152 | 5 |
| Inventive Sample Traverse Direction | 3,136 | 56 | 5 |
| Comparative Sample Machine Direction | 2,400 | 160 | 5 |
| Comparative Sample Transverse Direction | 1,720 | 120 | 5 |
| Tear at 2.0 in/min, lb. | | | |
| Inventive Sample Machine Direction | 22.3 | 1.6 | 5 |
| Inventive Sample Traverse Direction | 22.1 | 0.4 | 5 |
| Comparative Sample Machine Direction | 2.2 | 0.1 | 5 |
| Comparative Sample Transverse Direction | 1.6 | 0.1 | 5 |
| Caliper, mil. | | | |
| Inventive Sample With Liner | 68.4 | 0.5 | 10 |
| Inventive Sample Without Liner | 65.4 | 0.5 | 10 |
| Comparative Sample | 5.5 | 0.04 | 10 |
| Adhesion to Stainless lb/in width | | | |

-continued

|  | Average | σ (standard deviation) | N (test numbers) |
|---|---|---|---|
| Inventive Sample | 5.2 | 0.5 | 5 |
| Comparative Sample | 1.7 | 0.03 | 5 |
| Abrasion Resistance | | | |
| Inventive Sample | Excellent - no sign of damage | | |
| Comparative Sample | Fair - moderate damage | | |

Since certain changes may be made without departing from the scope of the invention herein involved, it is intended that all matter described in the foregoing description, including the examples, shall be interpreted as illustrative and not in a limiting sense.

What is claimed is:

1. An adhesive tape comprising:
   a polymer having a Shore A Hardness of between 92 and 100; and
   a layer of pressure sensitive adhesive comprising a first side and an opposed second side, the first side being in direct and uninterrupted contact with the polymer layer where the adhesive tape comprises an average thickness between 65 mil and 69 mil.

2. An adhesive tape for application to a flooring environment comprising:
   a polymer layer having a thickness between 0.020" and 0.065", the polymer layer defining a first side; and
   a double sided adhesive layer where one side of the double sided adhesive layer is in substantially continuous contact with the first side of the polymer layer and an opposing side of the double sided adhesive layer is disposed to adhere to the flooring environment;
   where the adhesive tape has a peel adhesion greater than 2.0 lb/in width, measured under a test method including peeling the tape at a 90 degree angle after application to a stainless steel panel.

3. The adhesive tape as set forth in claim 2, wherein the test method further includes peeling the tape at a 90 degree angle after application to a stainless steel panel and allowing a dwell of one hour.

4. The adhesive tape as set forth in claim 2, further comprising a substantially planar floor adhered to the adhesive on the opposing side, where the adhesive tape provides an aisle marking system.

5. An adhesive tape comprising:
   a polymer layer having a Shore A Hardness of between 92 and 100 and a substantially uniform thickness of between about 0.020" to 0.065"; and
   a layer of adhesive attached to said polymer layer;
   where the adhesive tape comprises a peel adhesion greater than 2.0 lb/in width when peeled at a 90 degree angle under a modified PSTC-101 method where the modified PSTC-101 method comprises a dwell time of one hour.

6. The adhesive tape of claim 5, further comprising a substrate attached to an outermost side of said layer of adhesive.

7. The adhesive tape claim of claim 5, wherein said polymer layer includes a textured surface.

8. The adhesive tape of claim 5, wherein said polymer layer is comprised of a polyvinyl chloride.

9. The adhesive tape of claim 8, wherein said polyvinyl chloride comprises a clear polymer.

10. The adhesive tape of claim 5, wherein said polymer layer includes coloring pigment.

11. The adhesive tape of claim 5, wherein said adhesive comprises a rubberized double-sided tape.

12. The adhesive tape of claim 5, the adhesive tape claim of claim 1, wherein said polymer layer has a Shore A Hardness of between about 93 and 97.

13. The adhesive tape of claim 5, wherein said adhesive is pressure sensitive.

* * * * *

UNITED STATES PATENT AND TRADEMARK OFFICE
CERTIFICATE OF CORRECTION

| | | |
|---|---|---|
| PATENT NO. | : 8,088,480 B2 | Page 1 of 1 |
| APPLICATION NO. | : 10/674108 | |
| DATED | : January 3, 2012 | |
| INVENTOR(S) | : Thomas R. Goecke | |

It is certified that error appears in the above-identified patent and that said Letters Patent is hereby corrected as shown below:

IN THE CLAIMS:

In Column 5, Lines 3-4, Claim 12, delete "the adhesive tape claim of claim 1," so Claim 12 will read as follows:

12. The adhesive tape of claim 5, wherein said polymer layer has a Shore A Hardness of between about 93 and 97.

Signed and Sealed this
Seventh Day of February, 2012

David J. Kappos
*Director of the United States Patent and Trademark Office*

(12) EX PARTE REEXAMINATION CERTIFICATE (9969th)
United States Patent
Goecke

(10) Number: US 8,088,480 C1
(45) Certificate Issued: Dec. 3, 2013

(54) ADHESIVE TAPE

(75) Inventor: Thomas R. Goecke, Rocky River, OH (US)

(73) Assignee: Shieldmark, Inc., Rocky River, OH (US)

Reexamination Request:
No. 90/012,670, Sep. 15, 2012

Reexamination Certificate for:
Patent No.: 8,088,480
Issued: Jan. 3, 2012
Appl. No.: 10/674,108
Filed: Sep. 29, 2003

Certificate of Correction issued Feb. 7, 2012

(51) Int. Cl.
*D06N 7/04* (2006.01)
*C09J 7/02* (2006.01)
*B32B 7/12* (2006.01)

(52) U.S. Cl.
CPC ............... *C09J 7/0264* (2013.01); *C09J 7/0278* (2013.01); *C09J 2427/006* (2013.01); *Y10S 428/906* (2013.01)
USPC ........... 428/343; 428/141; 428/332; 428/337; 428/906

(58) Field of Classification Search
None
See application file for complete search history.

(56) References Cited

To view the complete listing of prior art documents cited during the proceeding for Reexamination Control Number 90/012,670, please refer to the USPTO's public Patent Application Information Retrieval (PAIR) system under the Display References tab.

*Primary Examiner* — Ling Xu

(57) ABSTRACT

The adhesive tape of this application comprises a layer of polymeric material, particularly a polyvinyl chloride, having a Shore A Hardness of between 92 and 100 and a layer of adhesive material attached to a surface of the layer of polymeric material.

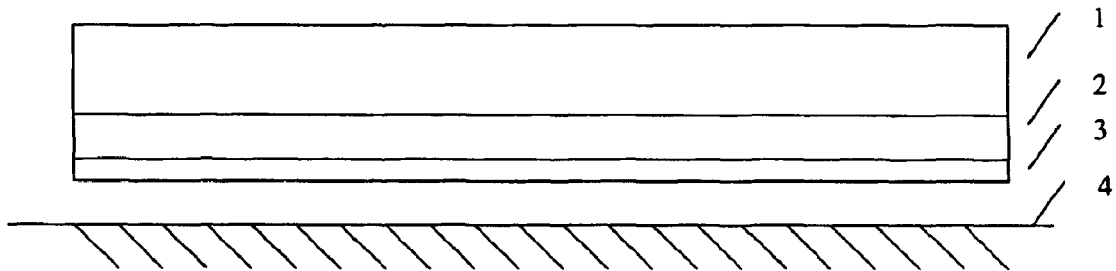

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1 and 4-13 is confirmed.

Claims 2-3 are cancelled.

\* \* \* \* \*